United States Patent
Aldehayyat et al.

(10) Patent No.: US 9,728,915 B2
(45) Date of Patent: Aug. 8, 2017

(54) TAPERED-FANG ELECTRONIC CONNECTOR

(71) Applicant: Microsoft Technology Licensing, LLC, Redmond, WA (US)

(72) Inventors: Yazan Aldehayyat, Seattle, WA (US); Wei Guo, Sammamish, WA (US); Ivan Andrew McCracken, Sammamish, WA (US); Duane Martin Evans, Snohomish, WA (US); Kanth Nalini Kurumaddali, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/716,598

(22) Filed: May 19, 2015

(65) Prior Publication Data

US 2016/0344146 A1 Nov. 24, 2016

(51) Int. Cl.
*H01R 24/00* (2011.01)
*H01R 24/60* (2011.01)
(Continued)

(52) U.S. Cl.
CPC ............ *H01R 24/60* (2013.01); *H01R 24/58* (2013.01); *G06F 1/1669* (2013.01);
(Continued)

(58) Field of Classification Search
CPC H01R 2107/00; H01R 24/60; H01R 13/6471; H01R 13/64; H01R 13/648
(Continued)

(56) References Cited

U.S. PATENT DOCUMENTS

| 2,749,526 A | 6/1956 | Petersen |
| 3,264,601 A | 8/1966 | Hartholz |

(Continued)

FOREIGN PATENT DOCUMENTS

| DE | 4331280 C1 | 9/1994 |
| EP | 2169774 A1 | 3/2010 |

(Continued)

OTHER PUBLICATIONS

Pradip, et al., "Super Speed Data Traveller Usb 3.0", In International Journal of Computer Science and Applications, vol. 6, No. 2, Apr. 2013, pp. 202-210.

(Continued)

*Primary Examiner* — Xuong Chung Trans
(74) *Attorney, Agent, or Firm* — Alleman Hall Creasman & Tuttle LLP

(57) ABSTRACT

An electronic connector includes a base, and one or more tapered extensions protruding from the base. Each tapered extension includes a nose forming a terminal end of that tapered extension. Each tapered extension further includes first and second connection faces that form respective opposing sides of that tapered extension, and that taper toward each other from the base to the nose. Each tapered extension further includes first and second flank surfaces that form respective opposing sides of that tapered extension, and that taper toward each other from the base to the nose between the first and second connection faces. Each tapered extension further includes a first forward set of plural electrical contacts and a first rearward electrical contact located along the first connection face. Each tapered extension further includes a second forward set of plural electrical contacts and a second rearward electrical contact located along the second connection face.

20 Claims, 4 Drawing Sheets

(51) Int. Cl.
*H01R 24/58* (2011.01)
*G06F 1/16* (2006.01)
*H01R 13/62* (2006.01)
*H01R 13/6471* (2011.01)
*H01R 107/00* (2006.01)

(52) U.S. Cl.
CPC ...... *H01R 13/6205* (2013.01); *H01R 13/6471* (2013.01); *H01R 2107/00* (2013.01)

(58) Field of Classification Search
USPC .................................................. 439/660, 39
See application file for complete search history.

(56) References Cited

U.S. PATENT DOCUMENTS

| | | | |
|---|---|---|---|
| 3,553,633 A | 1/1971 | Ondrejka | |
| 3,696,319 A | 10/1972 | Olsson | |
| 3,703,615 A | 11/1972 | Vogt | |
| 4,131,378 A | 12/1978 | Daws | |
| 4,179,179 A | 12/1979 | Lowden | |
| 4,241,974 A | 12/1980 | Hardesty | |
| 4,421,371 A | 12/1983 | Clark et al. | |
| 4,537,459 A | 8/1985 | Brennan et al. | |
| 4,640,570 A | 2/1987 | Strate | |
| 4,687,267 A | 8/1987 | Header et al. | |
| 4,824,383 A | 4/1989 | Lemke | |
| 5,176,530 A | 1/1993 | Reylek et al. | |
| 5,383,790 A | 1/1995 | Kerek et al. | |
| 5,409,403 A | 4/1995 | Falossi et al. | |
| 5,510,957 A | 4/1996 | Takagi | |
| 5,552,959 A | 9/1996 | Penniman et al. | |
| RE35,508 E | 5/1997 | Lemke et al. | |
| 5,664,953 A | 9/1997 | Reylek | |
| 5,812,356 A | 9/1998 | O'Connor | |
| 5,993,263 A * | 11/1999 | Sampson | H01R 13/193 439/660 |
| 6,042,391 A | 3/2000 | Bodo et al. | |
| 6,074,225 A | 6/2000 | Wu et al. | |
| 6,132,254 A * | 10/2000 | Wu | H01R 13/518 439/540.1 |
| 6,280,209 B1 | 8/2001 | Bassler et al. | |
| 6,322,372 B1 | 11/2001 | Sato | |
| 6,565,363 B2 * | 5/2003 | Downing | H01R 13/6205 439/38 |
| 6,583,985 B2 | 6/2003 | Nguyen et al. | |
| 6,771,494 B2 | 8/2004 | Shimano | |
| 6,781,819 B2 | 8/2004 | Yang et al. | |
| 6,786,755 B2 | 9/2004 | Dambach et al. | |
| 6,845,005 B2 | 1/2005 | Shimano et al. | |
| 6,944,012 B2 | 9/2005 | Doczy et al. | |
| 7,094,089 B2 * | 8/2006 | Andre | H01R 12/7088 439/218 |
| 7,331,793 B2 | 2/2008 | Hernandez et al. | |
| 7,541,907 B2 | 6/2009 | Wang et al. | |
| 7,628,628 B2 | 12/2009 | Matsuda et al. | |
| 7,758,379 B2 | 7/2010 | Chen | |
| 7,815,450 B1 | 10/2010 | Chen et al. | |
| 7,837,499 B1 | 11/2010 | Chen | |
| 7,841,776 B2 | 11/2010 | DiFonzo et al. | |
| 8,077,454 B2 * | 12/2011 | Ward | G06F 1/1624 361/679.05 |
| 8,092,261 B2 | 1/2012 | Lord | |
| 8,147,277 B1 | 4/2012 | Wang et al. | |
| 8,342,857 B2 | 1/2013 | Palli et al. | |
| 8,461,465 B2 * | 6/2013 | Golko | H01R 13/516 174/359 |
| 8,506,332 B2 | 8/2013 | Sommers et al. | |
| 8,596,881 B2 | 12/2013 | Umeno | |
| 8,708,750 B2 * | 4/2014 | Ho | H01R 27/02 439/639 |
| 8,721,356 B2 | 5/2014 | Webb et al. | |
| 8,780,541 B2 | 7/2014 | Whitt, III et al. | |
| 8,784,123 B1 * | 7/2014 | Leiba | H01R 27/00 439/218 |
| 8,808,029 B2 * | 8/2014 | Castillo | H01R 13/6585 439/607.05 |
| 8,821,194 B2 | 9/2014 | Shih et al. | |
| 8,827,331 B2 | 9/2014 | Corcoran et al. | |
| 8,882,524 B2 * | 11/2014 | Golko | H01R 13/6273 439/218 |
| 8,911,260 B2 | 12/2014 | Golko et al. | |
| 8,947,861 B2 | 2/2015 | Staats et al. | |
| 9,017,092 B1 * | 4/2015 | McCracken | H01R 13/62 439/374 |
| 9,054,477 B2 | 6/2015 | Brickner et al. | |
| 9,069,527 B2 | 6/2015 | Leong et al. | |
| 9,112,304 B2 | 8/2015 | Rohrbach et al. | |
| 9,178,316 B1 * | 11/2015 | McCracken | H01R 13/62 |
| 2001/0053624 A1 | 12/2001 | Medina et al. | |
| 2004/0229502 A1 | 11/2004 | Hu et al. | |
| 2008/0127684 A1 | 6/2008 | Rudduck et al. | |
| 2009/0088024 A1 | 4/2009 | Ling et al. | |
| 2009/0117784 A1 | 5/2009 | Wu | |
| 2009/0318026 A1 | 12/2009 | Yi et al. | |
| 2011/0261509 A1 | 10/2011 | Xu et al. | |
| 2012/0015561 A1 | 1/2012 | Tsai | |
| 2012/0045920 A1 | 2/2012 | Wu | |
| 2012/0177324 A1 | 7/2012 | Schwandt et al. | |
| 2012/0200173 A1 | 8/2012 | Liu et al. | |
| 2012/0224316 A1 | 9/2012 | Shulenberger | |
| 2013/0021738 A1 | 1/2013 | Yang et al. | |
| 2013/0040470 A1 | 2/2013 | Gao et al. | |
| 2013/0115814 A1 | 5/2013 | Briant et al. | |
| 2013/0171885 A1 | 7/2013 | Zhang | |
| 2013/0217260 A1 | 8/2013 | Nichols et al. | |
| 2013/0273752 A1 | 10/2013 | Rudisill et al. | |
| 2013/0332642 A1 | 12/2013 | Capezza | |
| 2014/0130316 A1 | 5/2014 | Rudduck et al. | |
| 2014/0254077 A1 | 9/2014 | Griffin | |
| 2014/0347802 A1 | 11/2014 | Lee | |
| 2014/0362509 A1 | 12/2014 | Lin | |
| 2015/0116926 A1 | 4/2015 | Robinson et al. | |
| 2015/0277491 A1 | 10/2015 | Browning et al. | |
| 2015/0325953 A1 | 11/2015 | McCracken et al. | |
| 2016/0049752 A1 | 2/2016 | Qian et al. | |

FOREIGN PATENT DOCUMENTS

| | | |
|---|---|---|
| JP | H04317899 A | 11/1992 |
| WO | 2010065569 A2 | 6/2010 |
| WO | 2011088012 A1 | 7/2011 |
| WO | 2011150403 A1 | 12/2011 |
| WO | 2011163260 A1 | 12/2011 |
| WO | 2014120966 A1 | 8/2014 |
| WO | 2014164889 A2 | 10/2014 |
| WO | 2015171441 A1 | 11/2015 |

OTHER PUBLICATIONS

Zhou, et al., "Signal Integrity Analysis of High-Speed Signal Connector USB3.0", In Proceedings of Advanced Materials Research, vols. 760-762, Sep. 18, 2013.
U.S. Appl. No. 14/162,529, McCracken et al., "Electrical Contacts and Connectors", filed Jan. 23, 2014, 71 pages.
United States Patent and Trademark Office, Non-Final Office Action issued in U.S. Appl. No. 14/272,361, Sep. 4, 2014, 19 pages.
United States Patent and Trademark Office, Notice of Allowance issued in U.S. Appl. No. 14/272,361, Mar. 25, 2015, 9 pages.
United States Patent and Trademark Office, Office Action Issued in U.S. Appl. No. 14/312,553, Apr. 1, 2015, 6 pages.
United States Patent and Trademark Office, Notice of Allowance Issued in U.S. Appl. No. 14/312,553, Jul. 9, 2015, 8 pages.
United States Patent and Trademark Office, Supplemental Notice of Allowance Issued in U.S. Appl. No. 14/312,553, Aug. 14, 2015, 5 pages.
ISA European Patent Office, International Search Report and Written Opinion Issued in Application No. PCT/US2015/028681, Aug. 20, 2015, WIPO, 11 pages.
United States Patent and Trademark Office, Office Action Issued in U.S. Appl. No. 14/312,553, Sep. 8, 2014, 18 pages.

(56) References Cited

OTHER PUBLICATIONS

United States Patent and Trademark Office, Supplemental Notice of Allowance Issued in U.S. Appl. No. 14/312,553, Oct. 8, 2015, 2 pages.
The State Intellectual Property Office of China, Notice of Allowance Issued in Chinese Patent Application No. 201210388564.8, Oct. 10, 2015, China, 4 pages.
Hollister, S., "Lenovo ThinkPad Helix tablet/laptop hybrid gets a power-up when it docks," The Verge Website, Available Online at http://www.theverge.com/2013/1/6/3844010/lenovo-thinkpad-helix-convertible, Jan. 6, 2013, 3 pages.
Purcher, J., "Finally! Apple Reveals their Hybrid Notebook Tablet Details," Patently Apple Website, Available Online at http://www.patentlyapple.com/patently-apple/2013/04/finally-apple-reveals-their-hybrid-notebook-tablet-details.html, Apr. 4, 2013, 7 pages.
Zhou, S. et al., "Signal Integrity Analysis of High-speed Signal Connector USB3.0," Advanced Materials Research, vol. 760-762, Sep. 18, 2013, 6 pages.
Kessler, D., "Acer debuts the Aspire Switch 10, a convertible, detachable tablet," Windows Central Website, Available Online at http://www.windowscentral.com/acer-debuts-aspire-switch-10-convertible-tablet, Apr. 29, 2014, 13 pages.
"magneticUSB—The magnetic USB 2.0 cables by Rosenberger," magneticUSB Website, Available Online at http://www.magnetic-usb.com/ , Available as early as Jul. 17, 2014, 6 pages.
Smith, R., "USB Type-C: Charging Power, Display, & Data All in One—The 2015 MacBook Review," AnandTech Website, Available Online at http://www.anandtech.com/show/9136/the-2015-macbook-review/6, Apr. 14, 2015, 8 pages.
"ZNAPS—The $9 Magnetic Adaptor for your mobile devices by ZNAPS," Kickstarter Website, Available Online at https://www.kickstarter.com/projects/1041610927/znaps-the-9-magnetic-adapter-for-your-mobile-devic/description, Available as Early as Jul. 16, 2015, 28 pages.
"Magnector N10: The Magnetic Pogo Charging Cable for Nexus 10," Magnector Website, Available Online at http://magnector.com/?p=3025&ckattempt=1, Retrieved Dec. 24, 2015, 2 pages.
IPEA European Patent Office, Second Written Opinion Issued in Application No. PCT/US2015/028681, May 20, 2016, NIPO, 6 pages.
ISA European Patent Office, International Search Report and Written Opinion Issued in Application No. PCT/US2016/028192, Jun. 17, 2016, WIPO, 13 pages.
IPEA European Patent Office, International Preliminary Report on Patentability Issued in Application No. PCT/US2015/028681, Aug. 1, 2016, WIPO, 7 Pages.

* cited by examiner

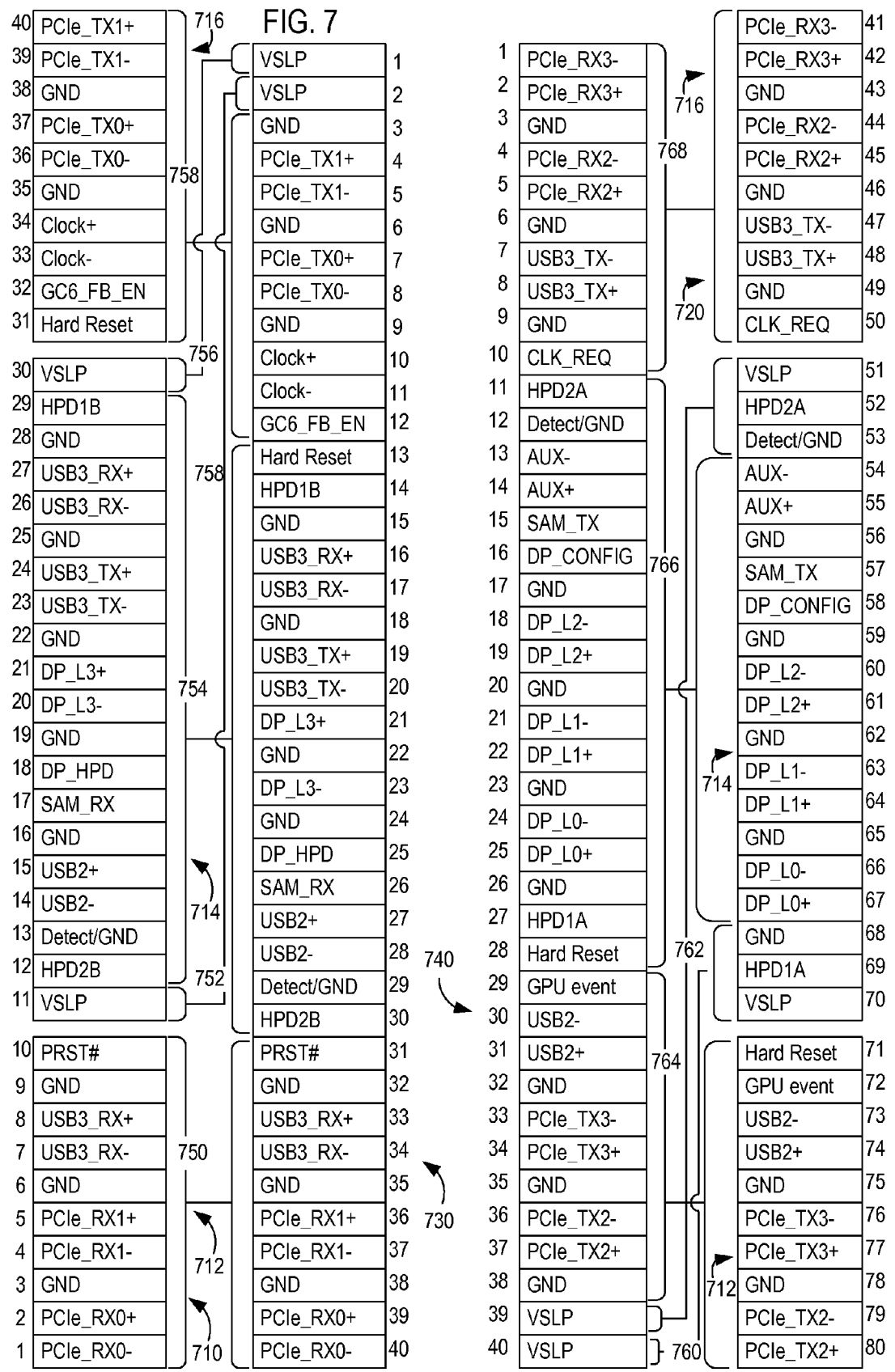

TAPERED-FANG ELECTRONIC CONNECTOR

BACKGROUND

Electronic devices often include hardware interfaces in the form of electronic connectors for exchanging electrical power, a ground reference, and/or communication signals with external devices. An electronic connector may include one or more electrical contacts that are each configured to physically contact and establish an electrical connection with a corresponding electrical contact of a paired electronic connector.

BRIEF DESCRIPTION OF THE DRAWINGS

FIG. 7 depicts an example pin-out configuration for an electronic connector.

DETAILED DESCRIPTION

Figure 1:
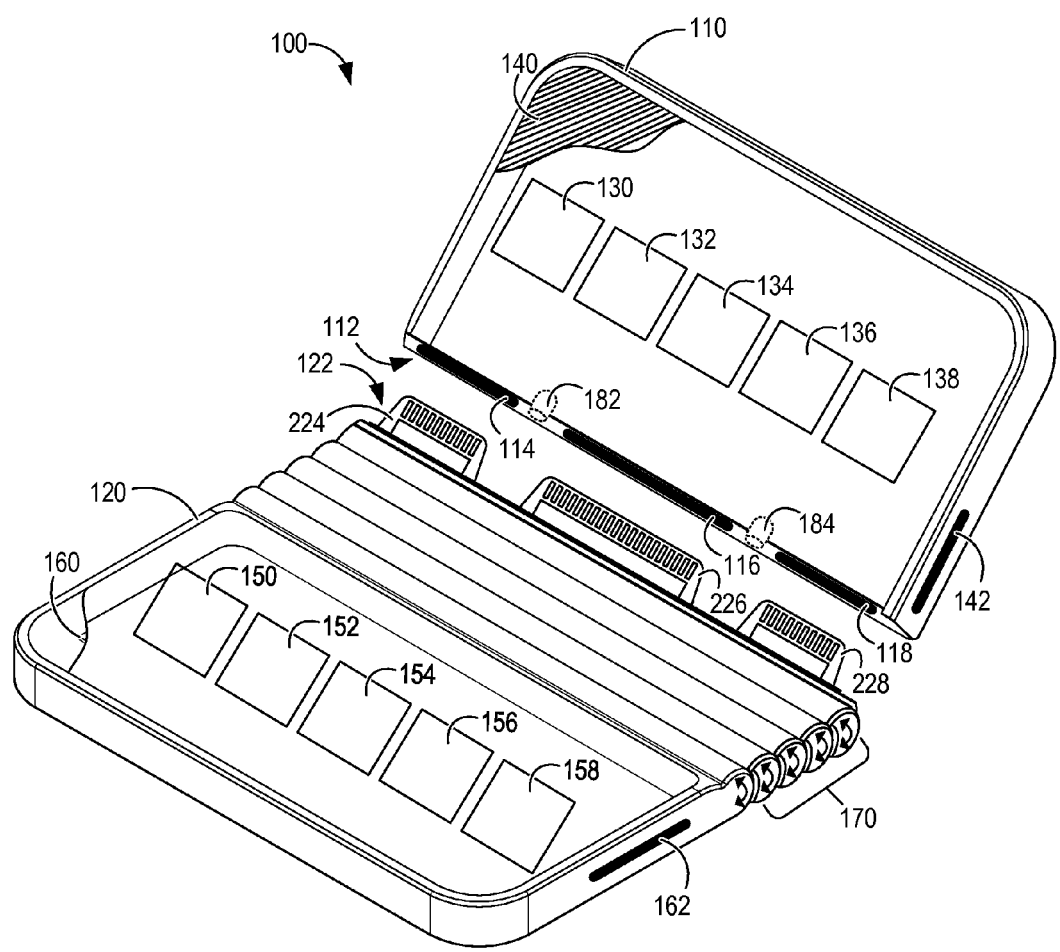
FIG. 1 depicts an example computing system incorporating a tapered-fang electronic connector.

FIG. 1 depicts an example computing system 100 that includes a pair of electronic connectors. In this example, a first electronic device 110 of computing system 100 includes a female electronic connector 112 having a plurality of receptacles (e.g., three receptacles 114, 116, 118) for receiving respective connection fangs of a corresponding male electronic connector. A second electronic device 120 includes a male electronic connector 122 that includes a plurality of connection fangs (e.g., three connection fangs 124, 126, 128) that correspond to the receptacles of female electronic connector 112. In other examples, first electronic device 110 may instead include male electronic connector 122 and second electronic device 120 may instead include female electronic connector 112.

First electronic device 110 and second electronic device 120 may be physically and electrically connected to each other by inserting connection fangs of male electronic connector 122 into corresponding receptacles of female electronic connector 112 to form a mated configuration. In a mated configuration, first electronic device 110 and second electronic device 120 may operatively interface with each other via a plurality of electrical connections established between female electronic connector 112 and male electronic connector 122. As an example, first electronic device 110 and second electronic device 120 may exchange electrical power, a ground reference, and/or communication signals via electrical contacts of female electronic connector 112 and male electronic connector 122.

In a mated configuration, female electronic connector 112 and male electronic connector 122 may further provide structural support between first electronic device 110 and second electronic device 130. For example, in a mated configuration, first electronic device 110 may be at least partially supported by second electronic device 120 in a vertical or angled orientation relative to a surface upon which second electronic device is supported.

First electronic device 110 and second electronic device 120 may be physically separated and electrically disconnected from each other by removing connection fangs of male electronic connector 122 from corresponding receptacles of female electronic connector 112. In a first mode of operation, one or both of first electronic device 110 and second electronic device 120 may be used individually in a physically separated and electrically disconnected configuration. In a second mode of operation, first electronic device 110 and second electronic device 120 may be used in combination with each other in a mated configuration to provide enhanced functionality.

In some examples, female electronic connector 112 and/or male electronic connector 122 may include one or more magnetically attractable elements that assist in holding female and male electronic connectors in a mated configuration. Non-limiting examples of a magnetically attractable element include a permanent magnet, an electromagnet, or a material element that is attractable by a magnet (e.g., a magnetically attractable metal-based material).

FIG. 1 depicts an example in which female electronic connector 112 includes two magnetically attractable elements 182, 184 located between receptacles 114, 116 and between receptacles 116, 118. In this example, magnetically attractable elements are included on or within a body portion of female electronic connector 112, which forms part of a device body of electronic device 100. In further examples, magnetically attractable elements may partially or fully surround some or all of the receptacles of a female electronic connector.

Additionally, male electronic connector 122 may include one or more magnetically attractable elements on or within a base portion of male electronic connector 122 that is located between and/or surrounds some or all of the connection fangs of the male electronic connector. As an example, a base of male electronic connector 122 may be formed from or may include one or more magnetically attractable elements.

In some examples, two or more magnetically attractable elements of an electronic connector may be configured to attract two or more corresponding magnetically attractable elements of a paired electronic connector in at least one connection orientation. Reversibility of paired electronic connectors may be enabled or precluded by selection of attracting or repelling polarities of magnetically attractable elements of one or both electronic connectors.

In the example depicted in FIG. 1, first electronic device 110 takes the form of a tablet computing device, and second electronic device 130 takes the form of a keyboard device. In other examples, first electronic device 110 and second electronic device 130 may include other suitable electronic devices that collectively form a computing system. For example, first electronic device 110 and second electronic device 130 may both be touchscreen devices, and both devices may be independently operable as computing devices.

As schematically illustrated in FIG. 1, first electronic device 110 may include a variety of components, including one or more of a logic machine 130 (e.g., one or more processors), an information storage machine 132 (e.g., one or more memory devices), an energy storage subsystem 134 (e.g., one or more batteries), a communications subsystem 136 (e.g., one or more wireless and/or wired communication devices to communicate with other electronic devices), an input/output subsystem 138 (e.g. one or more user input and/or output devices), and/or other components. In an example, first electronic device 110 includes a touch-sensitive graphical display 140 that forms part of input/output subsystem 138.

First electronic device 110 may further include one or more additional electronic connectors. As an example, first electronic device 110 may include an additional electronic connector 142 located along an exterior of a device body of first electronic device 110. Electronic connector 142 may include one or more receptacles having a similar form and/or electrical contact arrangement as one or more of receptacles 114, 116, 118 of female electronic connector 112. Alternatively or additionally, electronic connector 142 may include one or more connector fangs having a similar form and/or electrical contact arrangement as one or more of connector fangs 124, 126, 128 of male electronic connector 122.

In an example, electronic connector 142 takes the form of a pass-through electronic connector that includes a plurality of electrical contacts, at least some or all of which are electrically connected to at least some or all of the electrical contacts of female electronic connector 112. A pass-through electronic connector enables first electronic device 110 and/or second electronic device 120 to interface with additional electronic devices or external power sources even if female electronic connector 112 and male electronic connector 122 are in a mated configuration.

As schematically illustrated in FIG. 1, second electronic device 120 may also include a variety of components, including one or more of a logic machine 150, an information storage machine 152, an energy storage subsystem 154, a communications subsystem 156, an input/output subsystem 158, and/or other components. In an example, second electronic device 120 includes a keyboard 160 that forms part of input/output subsystem 158. User input received via keyboard 160 may be processed on-board second electronic device 120 and/or may be provided to first electronic device 110 for further processing via male electronic connector 122 and female electronic connector 112 in a mated configuration. Logic machine 150 of second electronic device 120 may take the form of a graphics processing unit that cooperates with logic machine 130 of first electronic device 110 to provide enhanced operation of computing system 100 as compared to operation of first electronic device 110 individually. In this example, logic machine 130 of first electronic device 110 may offload some processing tasks to logic machine 150 of second electronic device 120.

Second electronic device 120 may further include one or more additional electronic connectors. As an example, second electronic device 120 may include an additional electronic connector 162 located along an exterior of a device body of second electronic device 120. Electronic connector 162 may include one or more connector fangs having a similar form and/or electrical contact arrangement as one or more of connector fangs 124, 126, 128 of male electronic connector 122. Alternatively or additionally, electronic connector 162 may include one or more receptacles having a similar form and/or electrical contact arrangement as one or more of receptacles 114, 116, 118 of female electronic connector 112.

In an example, electronic connector 162 takes the form of a pass-through electronic connector that includes a plurality of electrical contacts, at least some or all of which are electrically connected to at least some or all of the electrical contacts of male electronic connector 122. As previously described, a pass-through electronic connector enables second electronic device 120 and/or first electronic device 110 to interface with additional electronic devices or external power sources even if female electronic connector 112 and male electronic connector 122 are in a mated configuration.

While FIG. 1 depicts first electronic device 110 as including a female electronic connector and second electronic device 120 as including a male electronic connector, in other examples first electronic device 110 may include a male electronic connector and second electronic device 120 may include a corresponding female electronic connector. In still further examples, first electronic device 110 and second electronic device 120 may each include a combination of one or more connection fangs and one or more fang-receiving receptacles.

In some examples, computing system 100 may further include a sequential multi-pivot hinge assembly 170. In this example, hinge assembly 170 forms part of second electronic device 120. In other examples, hinge assembly 170 may form part of first electronic device 110. Hinge assembly 170 enables two electronic devices that are in a mated configuration via female and male electronic connectors to rotate relative to each other about one or more pivot axes. As an example, first electronic device 110 may be folded relative to second electronic device 120 between an opened and closed configuration that simulates a notebook or a laptop computer.

In the example depicted in FIG. 1, hinge assembly 170 includes five parallel pivot axes arranged in sequential order. However, a sequential multi-pivot hinge assembly may include a greater or lesser number of parallel pivot axes. As depicted in FIG. 1, male electronic connector 122 is located at a distal end of hinge assembly 170. In other examples, a female electronic connector, such as example female electronic connector 112 may be located at a distal end of hinge assembly 170. In still further examples, hinge assembly 170 may be omitted.

Figure 2:
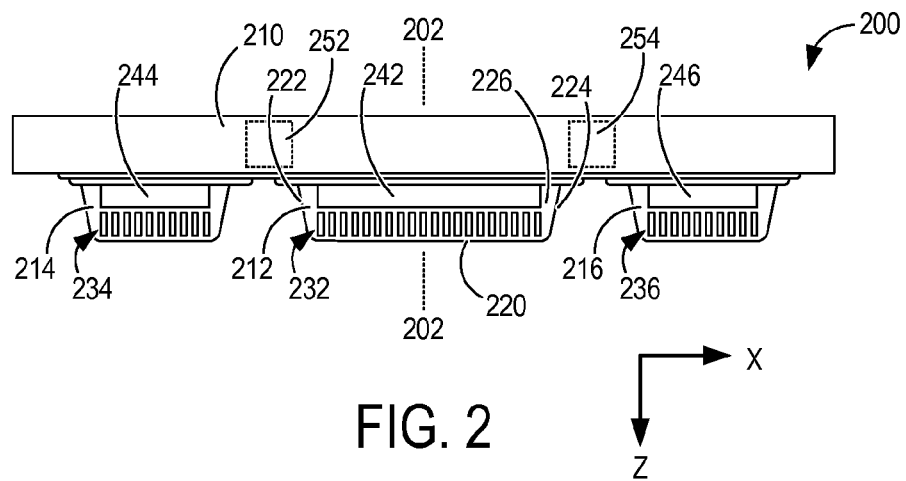
FIG. 2 depicts an example male electronic connector, as viewed along the Y-coordinate axis.

FIG. 2 shows an example male electronic connector 200. Male electronic connector 200 is a non-limiting example of male electronic connector 122 of FIG. 1. Within FIG. 2, male electronic connector 200 is viewed along a Y-coordinate axis of a Cartesian coordinate system. The Cartesian coordinate system of FIG. 2 is depicted consistently throughout FIGS. 2-6 to assist in the spatial understanding of example electronic connectors.

Male electronic connector 200 includes a base 210, and a plurality of connection fangs protruding from base 210. In some examples base 210 may form part of a device body of an electronic device. In this example, each connection fang takes the form of a tapered extension that protrudes from base 210 along the Z-coordinate axis. Male electronic connector 200 may be inserted into a corresponding female electronic connector along a connection axis that is parallel to the Z-coordinate axis.

In this example, male electronic connector 200 includes three tapered extensions protruding from base 210, including a central tapered extension 212, a first flanking tapered extension 214, and a second flanking tapered extension 216. First flanking tapered extension 214 is located on a first side of central tapered extension 212, and second flanking tapered extension 216 is located on a second side of central tapered extension 212 opposite the first side. Flanking tapered extensions 214, 216 are spaced apart from central tapered extension 212 by a distance as measured along the X-coordinate axis. For example, first flanking tapered extension 214 is spaced apart from first flank surface 222, and second flanking tapered extension 216 is spaced apart from second flank surface 224 of central tapered extension 212.

In other examples, a male electronic connector may include one, two, four, five or more connection fangs (and more specifically tapered extensions) that protrude from a base of the male electronic connector and are spaced apart from each other as measured along the X-coordinate axis. When multiple connection fangs are present, the connection fangs may be aligned horizontally (e.g., as depicted in FIG. 2), vertically (e.g., in a stacked configuration, or with other symmetrical alignments (e.g., 2×2 grid or 3×3 grid). Connection fangs may be equally spaced from each other as measured along the Y-coordinate axis and/or X-coordinate axis. In examples where connection fangs have different widths as measured along the X-coordinate axis, these connection fangs may be centered relative to each other vertically in a stacked configuration. In examples where connection fangs have different heights as measured along the Y-coordinate axis, these connection fangs may be centered relative to each other horizontally in a side-by-side configuration. In some examples, non-symmetrical alignments and/or spacings may be used.

In this example, male electronic connector 200 is symmetric about a symmetry plane 202 of a YZ-coordinate plane that passes through central tapered extension 212 between first flank surface 222 and second flank surface 224. Symmetric configurations may enable male electronic connector 200 to mate with a female electronic connector in two reversible orientations. In other examples, a male electronic connector may not be symmetric about any YZ-coordinate plane. Also in this example, central tapered extension 212 is wider than each of flanking tapered extensions 214, 216 as measured along the X-coordinate axis. The additional width of central tapered extension 212 as compared to flanking tapered extensions 214, 216 may accommodate a greater number of electrical contacts, for example.

In this example, flanking tapered extensions 214, 216 have the same shape and size. Also in this example, central tapered extension 212 and flanking tapered extensions 214, 216 extend from base 210 by the same distance as measured along the Z-coordinate axis. In other examples, some or all of the tapered extensions of a male electronic connector may have different shapes and/or sizes as measured along X, Y, and/or Z-coordinate axes. Furthermore, a male electronic connector may include connection fangs having other suitable shapes, including non-tapered, parallel walled connection fangs.

Each tapered extension of male electronic connector 200 includes a nose forming a terminal end of that tapered extension. As an example, central tapered extension 212 includes a nose 220. Each tapered extension of male electronic connector 200 further includes a first flank surface and a second flank surface that form respective opposing sides of that tapered extension. As an example, central tapered extension 212 includes a first flank surface 222 and a second flank surface 224 forming respective opposing sides of central tapered extension 212. Flank surfaces of each tapered extension of male electronic connector 200 taper toward each other from the base to the nose of that tapered extension. For example, first flank surface 222 and second flank surface 224 of tapered extension 212 taper toward each other from base 210 to nose 226.

As depicted in FIG. 2, opposing flank surfaces of each tapered extension are inclined at an angle relative to the YZ-coordinate plane. In an example, this angle may have a magnitude of 6 degrees. In another example, this angle may have a magnitude selected from the range of 5 degrees-7 degrees. In yet another example, this angle may have a magnitude selected from the range of 1 degree-10 degrees. In still further examples, this angle may have a magnitude selected from the range of >0 degrees-45 degrees. In still further examples, this angle may have a magnitude of zero to provide parallel opposing surfaces of a tapered extension or connection fang. In still further examples, opposing flank surfaces may be inclined at angles having different magnitudes relative to each other as measured in relation to the YZ-coordinate plane.

Each tapered extension of male electronic connector 200 further includes a first connection face and a second connection face forming opposing sides of that tapered extension between first and second flank surfaces. First and second flank surfaces of each tapered extension form opposing sides of that tapered extension between first and second opposing connection faces. As an example, central tapered extension 212 of FIG. 2 includes a first connection face 226 and a second connection face (not visible in FIG. 2) forming respective opposing sides of central tapered extension 212 between first flank surface 222 and second flank surface 224. First and second connection faces of each tapered extension of male electronic connector 200 taper toward each other from the base to the nose of that tapered extension.

Each tapered extension of male electronic connector 200 may further include a forward set of electrical contacts located along a first connection face of that tapered extension. For example, central tapered extension 212 includes a forward set 232 of plural electrical contacts. Flanking tapered extensions 214, 216 also include forward sets 234, 236 of plural electrical contacts, respectively.

In this example, forward set 232 of central tapered extension 212 includes twenty electrical contacts, and forward sets 234, 236 of flanking tapered extensions 214, 216 include ten electrical contacts. In other examples, each forward set of electrical contacts may include a greater or lesser number of electrical contacts. Central tapered extension 212 may include the same quantity of electrical contacts as flanking tapered extensions 214, 216 in other examples.

A second connection face (not visible in FIG. 2) of each tapered extension that opposes the first connection face of that tapered extension may include a second forward set of electrical contacts, and a second rearward electrical contact. In some examples, first and second forward sets of electrical contacts of each tapered extension may oppose each other and may be aligned with each other along the X-coordinate axis. In this example, each electrical contact of a first forward set may have an opposing electrical contact of a second forward set of a tapered extension to provide symmetry about an XZ-coordinate plane passing through the tapered extension. In other examples, an arrangement and/or quantity of forward electrical contacts may differ between first and second connection faces of a tapered extension.

In some examples, each electrical contact of a forward set of electrical contacts is offset from a terminal end of the tapered extension formed by a nose. In further examples, each electrical contact of a forward set of electrical contacts may be aligned along a straight line that is parallel to and offset from the terminal end formed by the nose of the tapered extension. FIG. 2 depicts an example in which all electrical contacts of forward sets 232, 234, 236 are offset from and aligned along a straight line with the terminal end of the tapered extensions. However, in other examples, forward sets of electrical contacts of each tapered extension of a male electronic connector may not be aligned with each other or may not be aligned along a straight line.

Each tapered extension of male electronic connector 200 further includes a rearward electrical contact located along a first connection face between the first forward set of electrical contacts of that tapered extension and base 210. As an example, central tapered extension 212 includes a rearward electrical contact 242. Flanking tapered extensions 214, 216 include rearward electrical contacts 244, 246, respectively. In this example, each rearward electrical contact of a tapered extension spans two or more of the forward set of electrical contacts between a first flank surface and a second flank surface of that tapered extension.

For example, rearward electrical contact 242 is wider than each individual electrical contact of forward set 232 (as measured along the X-coordinate axis), and spans all twenty electrical contacts of forward set 232. Rearward electrical contact 244 is wider than each individual contact of forward set 234 and spans all ten electrical contacts of forward set 234. Rearward electrical contact 246 is wider than each individual contact of forward set 236 and spans all ten electrical contacts of forward set 236. In other examples, a rearward electrical contact may span fewer than all electrical contacts of a forward set of electrical contacts. In still further examples, a rearward electrical contact may be one of a plurality of rearward electrical contacts of a connection face.

FIG. 2 further depicts an example of magnetically attractable elements 252, 254 located on and/or within base 210 of male electronic connector 200. In this example, magnetically attractable elements 252, 254 are located between central tapered extension 212 and each flanking tapered extension 214, 216. As previously described with reference to FIG. 1, magnetically attractable elements may be located between and/or surround some or all of the tapered extensions of a male electronic connector.

Figure 3:
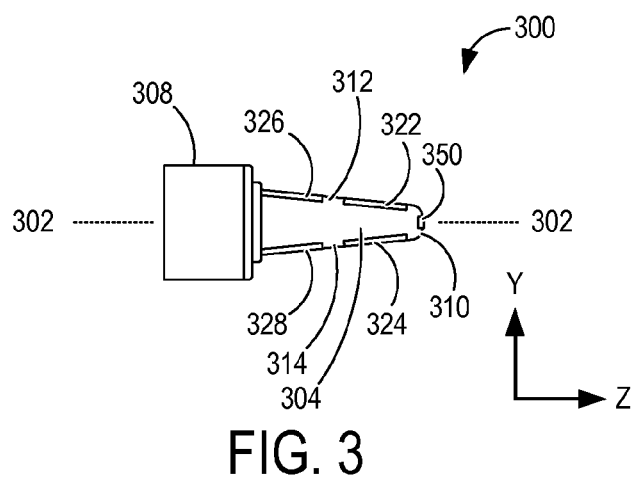
FIG. 3 depicts an example tapered extension of a male electronic connector, as viewed along the X-coordinate axis.

FIG. 3 depicts an example tapered extension 304 of a male electronic connector 300, as viewed along the X-coordinate axis. Male electronic connector 300 may represent a non-limiting example of male electronic connector 200 of FIG. 2 when viewed along the X-coordinate axis. Tapered extension 304 may represent any of central tapered extension 212 or flanking tapered extensions 214, 216 of male electronic connector 200, for example.

Tapered extension 304 protrudes from a base 308 along the Z-coordinate axis. Tapered extension 304 includes a nose 310 forming a terminal end of tapered extension 304. A first connection face 312 and a second connection face 314 form respective opposing sides of tapered extension 304 that taper toward each other from base 308 to nose 310.

Each of first connection face 312 and second connection face 314 are inclined at an angle relative to the XZ-coordinate plane. In an example, this angle may have a magnitude of 4 degrees. In another example, this angle may have a magnitude selected from the range of 3 degrees-5 degrees. In yet another example, this angle may have a magnitude selected from the range of 1 degree-10 degrees. In still further examples, this angle may have a magnitude selected from the range of >0 degrees-45 degrees. In still further examples, this angle may have a magnitude of zero to provide parallel opposing faces of a tapered extension or connection fang. In still further examples, first connection face 312 and second connection face 314 may be inclined at angles having different magnitudes relative to the XZ-coordinate plane.

In at least some examples, a smaller angle relative to the Z-coordinate axis (i.e., the connection axis in this example) may advantageously provide greater connection depth and/or connector retention by a female electronic connector, while a larger angle relative to the Z-coordinate axis may advantageously reduce connector depth and/or assist in connector mating with a female electronic connector. A smaller angle may also allow for a relatively smaller opening in the Y-coordinate direction of a corresponding female electronic connector, thus increasing options for small device size and/or female connector placement.

Tapered extension 304 includes a first forward set 322 of electrical contacts located along first connection face 312 that are offset from a terminal end of tapered extension 304 formed by nose 310. Tapered extension 304 further includes a second forward set 324 of electrical contacts located along second connection face 314 that are offset from the terminal end of tapered extension 304 formed by nose 310.

In this example, electrical contacts of first forward set 322 and second forward set 324 are offset from the terminal end of tapered extension 304 by the same offset distance as measured along the Z-coordinate axis. The same offset distance of the first forward set 322 and second forward set 324 enables an orientation of the male electronic connector to be reversible within a corresponding female electronic connector. In other examples, first forward set 322 and second forward set 324 may be offset by different offset distances from the terminal end of tapered extension 304.

Tapered extension 304 further includes a first rearward electrical contact 326 located along first connection face 312 between base 308 and first forward set 322 of electrical contacts. First rearward electrical contact 326 may span some or all of the electrical contacts of first forward set 322, such as previously described and depicted with reference to FIG. 2. In some examples, first rearward electrical contact 326 may serve as an additional ground contact, and first forward set 322 may include power, ground, and signal contacts.

Tapered extension 304 further includes a second rearward electrical contact 328 located along second connection face 314 between base 308 and second forward set 324 of electrical contacts. Second rearward electrical contact 328 may span some or all of the electrical contacts of second forward set 324. In some examples, second rearward electrical contact 328 may serve as an additional ground contact, and second forward set 324 may include power, ground, and signal contacts.

In this example, first rearward electrical contact 326 and second rearward electrical contact 328 are offset from the terminal end of tapered extension 304 by the same offset distance as measured along the Z-coordinate axis. The same offset distance of the rearward electrical contacts enables an orientation of the male electronic connector to be reversible with a corresponding female electronic connector. In other examples, first rearward electrical contact 326 and second rearward electrical contact 328 may be offset by different offset distances from the terminal end of tapered extension 304.

In some examples, each tapered extension may include flush surfaces among the various electrical contacts located along the connection faces of that tapered extension. In the example depicted in FIG. 3, outward facing surfaces of first forward set 322 and first rearward electrical contact 326 are flush with first connection face 312 of tapered extension 304. Outward facing surfaces of second forward set of electrical contacts 324 and second rearward electrical contact 328 are flush with second connection face 314 of tapered extension 304.

In some examples, each tapered extension may include opposing first and second connection faces that define first and second forward sets of plural openings or windows that are occupied by the first and second forward sets of electrical contacts. Additionally, these opposing first and second connection faces may further define first and second rearward openings or windows that are occupied by first and second rearward electrical contacts of that tapered extension.

Male electronic connector 300 may be symmetric about an XZ-coordinate plane. As depicted in FIG. 3, tapered extension 304 is symmetric about a symmetry plane 302 of the XZ-coordinate plane that passes through tapered extension 304. Symmetry plane 302 is orthogonal to symmetry plane 202 of FIG. 2, and passes through each tapered extension of the male electronic connector between that tapered extension's first and second connection faces. Symmetry about the XZ-coordinate plane may enable male electronic connector 300 to be reversible between two orientations when mated with a female electronic connector.

Tapered extension 304 may optionally include one or more nose electrical contacts 350 located at or along nose 310. As an example, nose electrical contacts 350 may include plural electrical contacts spaced apart from each other along the X-coordinate direction of nose 310. As another example, a single nose electrical contact may extend in the X-coordinate direction along nose 310 spanning some or all of the electrical contacts of first forward set 322 and second forward set 324, such as previously described with reference to rearward electrical contacts 326, 328.

Figure 4:
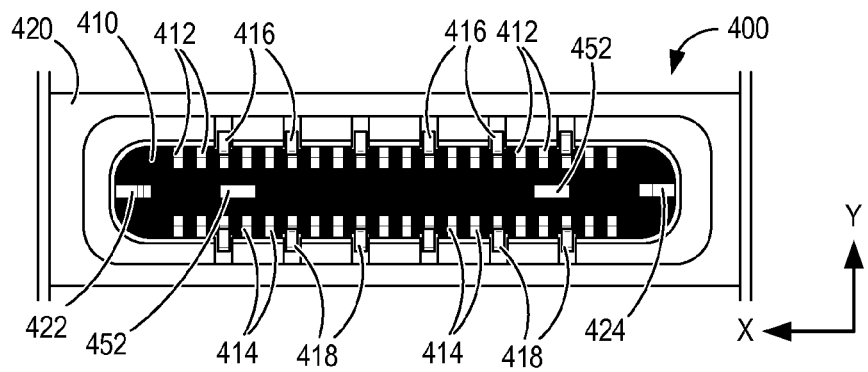
FIG. 4 depicts an example female electronic connector, as viewed along the Z-coordinate axis.

FIG. 4 depicts an example female electronic connector 400 as viewed along the Z-coordinate axis. Female electronic connector 400 includes a receptacle 410 that forms a female-side of an electronic connector pair with a connection fang of a corresponding male electronic connector. In this example, receptacle 410 is configured to receive central tapered extension 212 of male electronic connector 200 of FIG. 2.

Receptacle 410 includes a first inner set 412 of plural electrical contacts configured to physically contact and establish an electrical connection with respective electrical contacts of a first forward set of plural electrical contacts of a tapered extension. As an example, electrical contacts of first inner set 412 physically contact and establish an electrical connection with electrical contacts of forward set 232 of male electronic connector 200 in a mated configuration. As such, first inner set 412 includes 20 electrical contacts corresponding to 20 electrical contacts of forward set 232. In a reversible configuration, electrical contacts of first inner set 412 physically contact and establish an electrical connection with an opposing forward set of plural electrical contacts of tapered extension 212.

Receptacle 410 further includes a second inner set 414 of plural electrical contacts configured to physically contact and establish an electrical connection with respective electrical contacts of a second forward set of plural electrical contacts of the tapered extension. As an example, electrical contacts of second inner set 414 physically contact and establish an electrical connection with electrical contacts of an opposing forward set of electrical contacts of tapered extension 212 in a mated configuration. In a reversible configuration, electrical contacts of second inner set 414 physically contact and establish an electrical connection with electrical contacts of forward set 232 of male electronic connector 200.

Receptacle 410 further includes a first outer set 416 of one or more electrical contacts configured to physically contact and establish an electrical connection with a first rearward electrical contact of the tapered extension. In this example, first outer set 416 includes plural electrical contacts. Plural electrical contacts of first outer set 416 physically contact and establish multiple electrical connections with rearward electrical contact 242 of male electronic connector 200 in a mated configuration. In a reversible configuration, electrical contacts of first outer set 416 physically contact and establish an electrical connection with an opposing rearward electrical contact of tapered extension 212. In some examples, first outer set 416 may serve as additional ground contacts, and first inner set 412 may include power, ground, and signal contacts.

Receptacle 410 further includes a second outer set 418 of one or more electrical contacts configured to physically contact and establish an electrical connection with a second rearward electrical contact of the tapered extension. As an example, electrical contacts of second outer set 418 physically contact and establish multiple electrical connections with another rearward electrical contact of tapered extension 212 in a mated configuration. In a reversible configuration, electrical contacts of second outer set 418 physically contact and establish an electrical connection with rearward electrical contact 242 of male electronic connector 200. In some examples, second outer set 418 may serve as additional ground contacts, and second inner set 414 may include power, ground, and signal contacts.

Receptacle 410 may optionally include one or more terminal end electrical contacts 452 located at or along a terminal end of an interior surface of receptacle 410. Terminal end electrical contacts 452 may be configured to physically contact and establish an electrical connection with nose electrical contacts (e.g., 350 of FIG. 3) of a male electronic connector. As an example, terminal end electrical contacts 452 may include plural electrical contacts spaced apart from each other along the X-coordinate direction within receptacle 410. As another example, a single terminal end electrical contact may extend in the X-coordinate direction within receptacle 410 spanning some or all of the electrical contacts of first inner set 412 and second inner set 414.

In some examples, receptacle 410 optionally may include additional electrical contacts and/or retaining springs, such as depicted in FIG. 4 as elements 422, 424. In this example, elements 422, 424 are configured to physically contact (and in the case of electrical contacts, to establish an electrical connection with) opposing flank surfaces of a tapered extension, such as flank surfaces 222, 224 of tapered extension 212. In some examples, flank surfaces of a corresponding tapered extension may include electrical contacts to interface with elements 422, 424 in a mated configuration.

Female electronic connector 400 may further include additional receptacles, each configured to receive corresponding tapered extensions of a male electronic connector. As an example, female electronic connector 400 may include a second receptacle within a common device body 420 to receive second tapered extension 214 (or tapered extension 216 in a reversible configuration) of male electronic connector 200, and a third receptacle within common device body 420 configured to receive third tapered extension 216 (or tapered extension 214 in a reversible configuration) of male electronic connector 200.

Two or more receptacles of a female electronic connector may be spaced apart from each other, as measured along the X-coordinate axis, by a distance that corresponds to a spacing between tapered extensions of a corresponding male electronic connector. FIG. 1, for example, depicts a female electronic connector 112 that includes three receptacles 114, 116, 118 configured to receive three corresponding tapered extensions 124, 126, 128 of male electronic connector 122.

Figure 5:
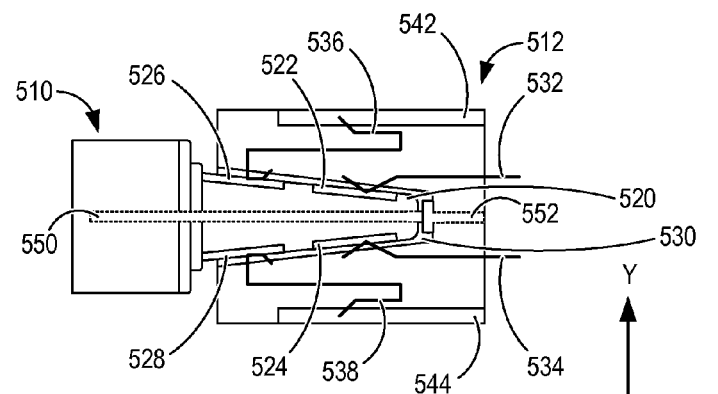
FIG. 5 depicts an example male electronic connector in a mated configuration with an example female electronic connector, as viewed along the X-coordinate axis.

FIG. 5 shows an example male electronic connector 510 and an example female electronic connector 512 in a mated configuration, as viewed along the X-coordinate axis. Male electronic connector 510 may represent a non-limiting example of previously described male electronic connectors 122 of FIG. 1, 200 of FIG. 2, and/or 300 of FIG. 3. Female electronic connector 512 may represent a non-limiting example of female electronic connectors 112 of FIG. 1 and/or 400 of FIG. 4.

In this example, a first forward set 522 of electrical contacts of a tapered extension 520 of male electronic connector 510 is physically contacting and interfacing electrically with a first inner set 532 of electrical contacts of receptacle 530. A second forward set 524 of electrical contacts of tapered extension 520 is physically contacting and interfacing electrically with a second inner set 534 of electrical contacts of receptacle 530. In an example, electrical contacts of first forward set 522, first inner set 532, second forward set 524, and second inner set 534 may include power, ground, and signal contacts.

A first rearward electrical contact 526 of tapered extension 520 is physically contacting and interfacing electrically with a first outer set 536 of electrical contacts of receptacle 530. A second rearward electrical contact 528 of tapered extension 520 is physically contacting and interfacing electrically with a second outer set 538 of electrical contacts of receptacle 530. In an example, electrical contacts of first rearward electrical contact 526, first outer set 536, second rearward electrical contact 528, and second outer set 538 may include ground contacts. These ground contacts may serve to reduce leakage of electromagnetic radiation from receptacle 530 and increase shielding of the electrical connections. Electromagnetic radiation leakage is further reduced and shielding is further increased in implementations where rearward electrical contacts 526, 528 span each of the forward electrical contacts of the tapered extension, which include power and signal contacts.

Figure 6:
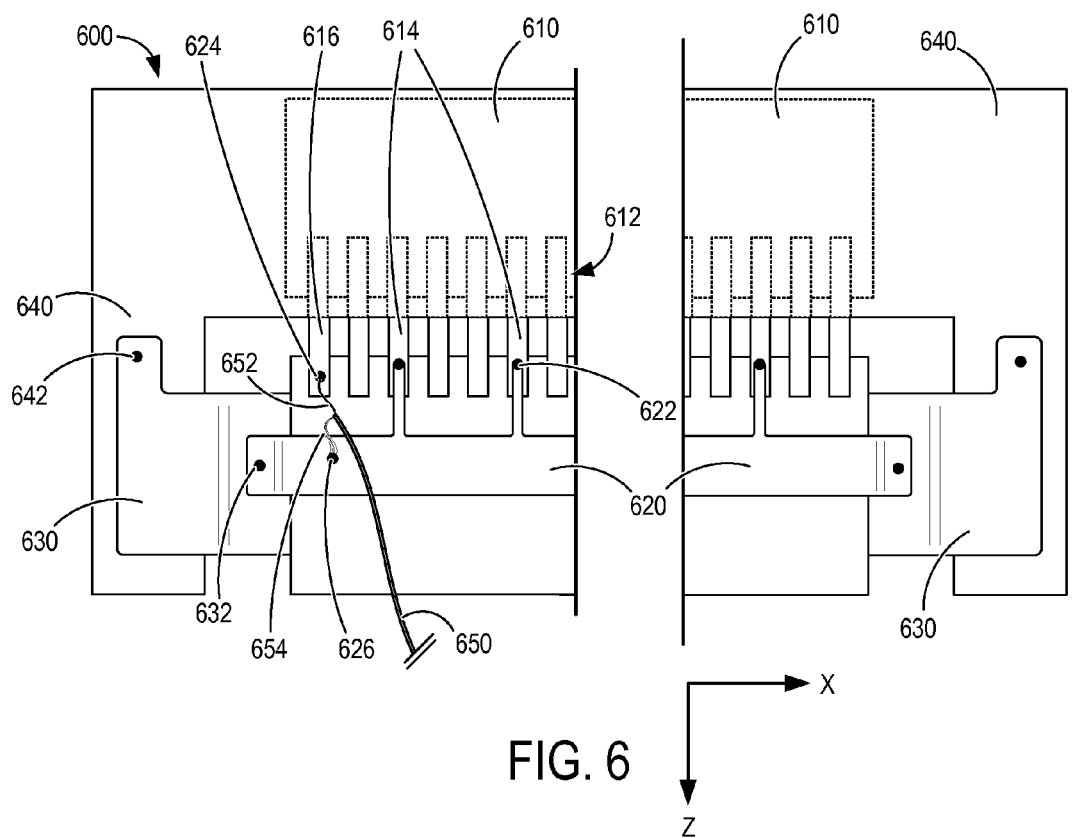
FIG. 6 depicts an internal view of an example electronic connector, as viewed along the Y-coordinate axis.

Within FIG. 5, one or more of electrical contacts of first outer set 536 may be electrically connected to a common electrical pathway 542. In an example, electrical pathway 542 may take the form of a ground shell that at least partially surrounds female electronic connector 512, and first outer set 536 may include ground contacts. Also within FIG. 5, one or more of electrical contacts of second outer set 538 may be electrically connected to a common electrical pathway 544, and second outer set 538 may also include ground contacts. In some examples, electrical pathway 544 may form part of the same ground shell as electrical pathway 542. FIG. 6 depicts an example ground shell in further detail.

Male electronic connector 510 may optionally include a male ground plane 550, and female electronic connector 512 may optionally include a female ground plane 552. In some examples, male ground plane 550 may physically contact and establish an electrical connection with female ground plane 552 via one or more electrical contacts when male electronic connector 510 and female electronic connector 512 are in a mated configuration. As an example, an electrical connection may be established between male ground plane 550 and female ground plane 552 via one or more nose electrical contacts (e.g., 350 of FIG. 3) of male electronic connector 510 and one or more terminal end electrical contacts (e.g., 452 of FIG. 4) of female electronic connector 512. In some examples, male ground plane 550 may be located within tapered extension 520 at or near an XZ symmetry plane of male electronic connector 510 and/or at or near a centerline of tapered extension 520. Male ground plane 550 may extend in the X-coordinate axis to span some or all of the forward and/or rearward electrical contacts of male electronic connector 510.

FIG. 6 is a schematic diagram depicting an internal view of an example electronic connector 600, as viewed along the Y-coordinate axis. In this example, electronic connector 600 takes the form of a female electronic connector with an outer portion (e.g., a portion of a ground shell) removed to reveal internal components. However, similar internal components of electronic connector 600 may be included within a corresponding male electronic connector.

In this example, electronic connector 600 includes a receptacle 610 having a plurality of electrical contacts 612 located therein for establishing an electrical connection with a corresponding male electronic connector. Alternatively, with regards to a male electronic connector, receptacle 610 may instead include a connection fang having the plurality of electrical contacts 612. Each of ground contacts 614 of the plurality of electrical contacts 612 are electrically connected to a ground bar 620, as indicated at 622, for example. Ground bar 620 spans each electrical contact of receptacle 610. In some examples, ground bar 620 may span electrical contacts of a plurality of receptacles or a plurality of connection fangs of an electronic connector.

Ground bar 620 may be electrically connected to a ground plate 630, as indicated at 632, for example. In some examples, a ground plate may extend into each connection fang (e.g., tapered extension) of a male electronic connector between electrical contacts of a first connection face and electrical contacts of a second connection face. As an example, a ground plate may reside at or near an XZ-coordinate symmetry plane of the electronic connector to provide shielding between electrical contacts of a first connection face and electrical contacts of a second connection face and/or to provide an additional ground path for one or more ground contacts of the electronic connector.

Ground plate 630 may be electrically connected to ground shell 640, as indicated at 642. Ground shell 640 may at least partially surround and/or encapsulate receptacle 610 and electrical contacts 612 to provide shielding of the internal components depicted in FIG. 6. When a connection fang of a male electronic connector is in a mated configuration with a female electronic connector, ground shell 640 at least partially surrounds and/or encapsulates the connection fang and electrical contacts of the connection fang to provide additional shielding of electrical components.

The ground shell, in combination with rearward electrical contacts spanning some or all of the forward electrical contacts of a connection fang, substantially surround signal and power contacts located at a forward end of the connection fang and/or corresponding contacts located within an inner region of the receptacle. The ground shell and surrounding ground pathways serve to further reduce leakage of electromagnetic radiation and provide increased shielding of electrical connections. In some use-scenarios, this collection of grounding elements may act as a Faraday cage that surrounds signal and power contacts in multiple dimensions. The various forms of shielding may collectively enable data transfer rates above 10 Gbps while maintaining electromagnetic radiation leakage below regulatory levels.

In some examples, each non-ground contact (e.g., signal and/or power pins) of electrical contacts 612 are electrically connected to a corresponding conductor core of a respective coaxial wire. For example, non-ground contact 616 is electrically connected to conductor core 652 of coaxial wire 650, as indicated at 624. A shielding sheath of each coaxial wire surrounding the conductor core may be electrically connected to ground bar 620. For example, shielding sheath 654 of coaxial cable 650 is electrically connected to ground bar 620, as indicated at 626.

With regards to male electronic connectors, each connection fang (e.g., tapered extension) may include an associated ground bar that spans some or all of the electrical contacts of that connection fang. Ground contacts of each connection fang may be electrically connected to a respective ground bar and/or a ground shell, for example, as described with reference to the female connector in FIGS. 5 and 6.

In examples where a ground plane is included, such as previously described male ground plane 550 or female ground plane 552 of FIG. 5, one or more of ground bar 620, ground plate 630, and/or ground shell 640 may be electrically connected to the ground plane. The ground plane may further reduce leakage of electromagnetic radiation and provide increased shielding of electrical connections. As an example, the ground plane may reduce electromagnetic interaction between electrical contacts located on opposing connection faces or surfaces of a tapered extension of an electronic connector.

FIG. 7 depicts an example pin-out configuration for an electronic connector. The electronic connector of FIG. 7 may take the form of a female electronic connector, such as example female electronic connector 112 of FIG. 1 or female electronic connector 400 of FIG. 4. Alternatively, the electronic connector of FIG. 7 may take the form of a male electronic connector, such as example male electronic connectors 122 of FIG. 1, 200 of FIG. 2, and/or 300 of FIG. 3.

A first set 710 of electrical contacts includes forty (40) electrical contacts, numbered 1-40, that are divided among three connection fangs or receptacles. Within first set 710, electrical contacts numbered 1-10 form part of a first connection fang or receptacle 712, electrical contacts numbered 11-30 form part of a second connection fang or receptacle 714, and electrical contacts numbered 31-40 form part of a third connection fang or receptacle 716. As an example, each electrical contact of first set 710 may take the form of a first forward set of electrical contacts located along a first connection face of a male electronic connector. As another example, each electrical contact of first set 710 may take the form of a first inner set of electrical contacts located within a female electronic connector.

A second set 720 of electrical contacts includes forty (40) electrical contacts, numbered 41-80 that are divided among the three connection fangs or receptacles 712, 714, 716. Within second set 720, electrical contacts numbered 71-80 form part of first connection fang or receptacle 712, electrical contacts numbered 51-70 form part of second connection fang or receptacle 714, and electrical contacts numbered 41-50 form part of third connection fang or receptacle 716. As an example, each electrical contact of second set 720 may take the form of a second forward set of electrical contacts located along a second connection face a male electronic connector. As another example, each electrical contact of second set 720 may take the form of a second inner set of electrical contacts located within a female electronic connector.

In this example, electrical contact numbered 1 of first connection fang or receptacle 712 is located along an opposing connection face from electrical contact numbered 80 of first connection fang or receptacle 712, and electrical contact 40 of third connection fang or receptacle 716 is located along an opposing connection face from electrical contact numbered 41 of third connection fang 716. Intermediate electrical contacts are numbered in sequential order as arranged along each connection face.

Within FIG. 7, GND refers to a ground path, PCIe_RX refers to a Peripheral Component Interconnect (PCI) express receive path, PCIe_TX refers to a PCI express transmit path, USB3_RX refers to a Universal Serial Bus (USB) 3.0 receive path, USB3_TX refers to a USB 3.0 transmit path, USB2 refers to a USB 2.0 D+ (data plus) and/or D− (data minus) paths, HPD1A refers to Hot Plug Detect 1A, HPD2A refers to Hot Plug Detect 2A, HPD1B refers to Hot Plug Detect 1B, HPD2B refers to Hot Plug Detect 2B, PRST# refers to Power-on reset, VSLP refers to power, Detect/GND refers to a ground path and/or Detect pin, SAM_RX refers to Sensor Aggregator Module receiver path, DP_HPD refers to DisplayPort Hot Plug, DP_L refers to DisplayPort Lane, DP_CONFIG refers to DisplayPort configuration, AUX refers to Auxiliary channel, Hard Reset refers to Hardware Reset, GC6_FB_EN refers to Gold Candidate Six Feedback Enable, Clock refers to PCIe reference clock, GPU event refers to Graphics Processing Unit event, CLK_REQ refers to PCIe clock request.

FIG. 7 further depicts a pin-out configuration for example printed circuit board (PCB) interconnects, including a first PCB interconnect 730 and a second PCB interconnect 740 for integrating the electronic connector of FIG. 7 with an electronic device. In this example, two PCB interconnects are used to establish electrical connections between the electronic connector and one or more components of an electronic device. However, in other examples, a single PCB interconnect may be used, or three or more PCB interconnects may be used to establish an electrical connection between the electronic connector and electronic device components. In still further examples, PCB interconnects may be omitted, such as if electrical contacts of an electronic connector are directly wired to or otherwise electrically connected to one or more PCBs of an electronic device.

In this example, first PCB interconnect 730 is used to establish electrical connections with electronic device components for each electrical contact of first set 710. As an example, electrical contacts numbered 1-10 of first set 710 are connected to electrical contacts numbered 40-31 of first PCB interconnect 730 via electrical pathways 750. Electrical contact number 11 of first set 710 is connected to electrical contact number 2 of first PCB interconnect 730 via electrical pathway 752. Electrical contacts numbered 12-29 of first set 710 are connected to electrical contacts numbered 30-13 via electrical pathways 754. Electrical contact number 30 of first set 710 is connected to electrical contact number 1 of first PCB interconnect 730 via electrical pathway 756. Electrical contacts numbered 31-40 of first set 710 are connected to electrical contacts numbered 12-3 via electrical pathways 758.

Additionally in this example, second PCB interconnect 740 is used to establish an electrical connection for each electrical contact of second set 720. As an example, electrical contacts numbered 70-68 of second set 720 are connected to electrical contact number 40 of second PCB interconnect 740 via one or more electrical pathways 760. Electrical contacts numbered 53-51 of second set 720 are connected to electrical contact number 39 of second PCB interconnect 740 via one or more electrical pathways 762. Electrical contacts numbered 80-71 of second set 720 are connected to electrical contacts numbered 38-29 of second PCB interconnect 740 via electrical pathways 764. Electrical contacts numbered 67-54 of second set 720 are connected to electrical contacts numbered 28-11 of second PCB interconnect 740 via electrical pathways 766. Electrical contacts numbered 50-41 of second set 720 are connected to electrical contacts numbered 10-1 of second PCB interconnect 740 via electrical pathways 768.

Some or all of electrical pathways 750, 752, 754, 756, 758, 760, 762, 764, 766, and 768 may take the form of flexible wiring. The use of flexible wiring may aid in the manufacturing and assembly of an electronic device that incorporates an electronic connector. However, in other examples, non-flexible electrical pathways may be used to connect an electronic connector to electronic device components.

As an example, each of electrical pathways 752, 756, 760, 762 associated with VSLP may take the form of an individual wire (e.g., a 34 gauge discrete wire). Electrical pathways 750, 754, 758, 764, 766, 768 may each include a plurality of coaxial wires (e.g., 38 gauge coaxial wiring) in which each non-ground electrical contact is connected by a conductor core of a respective coaxial wire and each ground electrical contact is connected by one or more shielding sheaths the coaxial wires. In the example depicted in FIG. 7, a total of 56 coaxial wires and 4 individual wires may be used to connect all 80 electrical contacts of first set 710 and second set 720 to first PCB interconnect 730 and second PCB interconnect 740.

FIG. 7 does not depict pin-out configurations for rearward electrical contacts (e.g., ground contacts) of a male electronic connector or outer electrical contacts (e.g., ground contacts) of a female electronic connector. However, as previously described with reference to FIGS. 5 and 6, rearward electrical contacts of a male electronic connector and outer electrical contacts of a female electronic connector may be electrically connected to a common ground bar or ground plate that is in turn electrically connected to one or more electrical pathways (e.g., one or more shielding sheaths of coaxial wires) of the ground contacts depicted in FIG. 7.

While FIG. 7 depicts an example pin-out configuration for an electronic connector, it will be understood that other suitable pin-out configurations may be used, depending on implementation. As an example, some pin-out configurations may support or preclude reversibility of an electronic connector between two different orientations in a mated configuration with another electronic connector. As another example, a male electronic connector and/or a female electronic connector may include power contacts and some or all of the ground contacts, but may not include some or all of the signal contacts. This example may be used in configurations supporting battery charging or power supply modes of operation.

In some examples, one or more electrical contacts may be omitted (e.g., omitted signal contacts in configurations supporting battery charging or power supply modes of operation). A corresponding region of the connection faces where omitted electrical contacts would otherwise reside may be recessed or portions of the tapered extension may be gapped or otherwise omitted.

The electronic connectors described herein may be constructed using a variety of manufacturing techniques including, as non-limiting examples: plastic injection molding, inset molding, and overmolding for tapered extension and base components of the electronic connector; and metal blanking, forming, and stamping for electrical contacts and other conductive components. Manual and/or automated assembly processes may be used to combine connector components. The back end of the electrical contacts may be soldered to a paddle card (e.g., a PCB) or wired directly to cable wires. The base of the electronic connector and paddle card then may be overmolded with plastic, as an example.

In an example, an electronic connector comprises a base; a central tapered extension protruding from the base; a first flanking tapered extension protruding from the base on a first side of the central tapered extension, and spaced apart from the central tapered extension; and a second flanking tapered extension protruding from the base on a second side of the central tapered extension opposite the first side, and spaced apart from the central tapered extension. The central tapered extension, the first flanking tapered extension, and the second flanking tapered extension each include a nose forming a terminal end of that tapered extension, a first connection face, a second connection face in which the first connection face and the second connection face form respective opposing sides of that tapered extension, and taper toward each other from the base to the nose, a first flank surface, a second flank surface, in which the first flank surface and the second flank surface form respective opposing sides of that tapered extension between the first connection face and the second connection face, and taper toward each other from the base to the nose, a first forward set of plural electrical contacts located along the first connection face between the first flank surface and the second flank surface, and offset from the terminal end formed by the nose, a first rearward electrical contact located along the first connection face between the first forward set of plural electrical contacts and the base, and spanning all of the first forward set of plural electrical contacts between the first flank surface and the second flank surface, a second forward set of plural electrical contacts located along the second connection face between the first flank surface and the second flank surface, and offset from the terminal end formed by the nose, and a second rearward electrical contact located along the second connection face between the second forward set of plural electrical contacts and the base, and spanning all of the second forward set of plural electrical contacts between the first flank surface and the second flank surface. In an example, the first flanking tapered extension is spaced apart from the first flank surface of the central tapered extension, and the second flanking tapered extension is spaced apart from the second flank surface of the central tapered extension. In an example, the central tapered extension includes twenty electrical contacts of the first forward set of plural electrical contacts located along the first connection face of the central tapered extension, and the central tapered extension includes twenty electrical contacts of the second forward set of plural electrical contacts located along the second connection face of the central tapered extension. In an example, the first flanking tapered extension and the second flanking tapered extension each include ten electrical contacts of the first forward set of plural electrical contacts located along the first connection face of that flanking tapered extension, and ten electrical contacts of the second forward set of plural electrical contacts located along the second connection face of that flanking tapered extension. In an example, the electronic connector is symmetric about a first symmetry plane that passes through the central tapered extension between the first flank surface and the second flank surface of the central tapered extension. In an example, the electronic connector is symmetric about a second symmetry plane that is orthogonal to the first symmetry plane, and the second symmetry plane passes through each tapered extension between the first connection face and the second connection face of that tapered extension.

In an example, an electronic connector comprises a base; a tapered extension protruding from the base and including: a nose forming a terminal end of the tapered extension, a first connection face, a second connection face, the first connection face and the second connection face tapering toward each other from the base to the nose, a first flank surface, a second flank surface, the first flank surface and the second flank surface forming respective opposing sides of the tapered extension between the first connection face and the second connection face, and tapering toward each other from the base to the nose, a first forward set of plural electrical contacts located along the first connection face between the first flank surface and the second flank surface, and offset from the terminal end formed by the nose, a first rearward electrical contact located along the first connection face between the first forward set of plural electrical contacts and the base, and spanning two or more of the first forward set of plural electrical contacts between the first flank surface and the second flank surface, a second forward set of plural electrical contacts located along the second connection face between the first flank surface and the second flank surface, and offset from the terminal end formed by the nose, and a second rearward electrical contact located along the second connection face between the second forward set of plural electrical contacts and the base, and spanning two or more of the second forward set of plural electrical contacts between the first flank surface and the second flank surface. In an example, the tapered extension is one of a plurality of tapered extensions of the electronic connector. In an example, the plurality of tapered extensions includes a central tapered extension, and two flanking tapered extensions located on either side of the central tapered extension and spaced apart from the central tapered extension. In an example, the first forward set of plural electrical contacts located along the first connection face includes twenty electrical contacts, and the second forward set of plural electrical contacts located along the second connection face includes twenty electrical contacts. In an example, the first forward set of plural electrical contacts located along the first connection face includes ten electrical contacts, and the second forward set of plural electrical contacts located along the second connection face includes ten electrical contacts. In an example, the first rearward electrical contact spans all electrical contacts of the first forward set of plural electrical contacts, and the second rearward electrical contact spans all electrical contacts of the second forward set of plural electrical contacts. In an example, each electrical contact of the first forward set of plural electrical contacts is aligned along a first straight line that is parallel to and offset from the terminal end of the tapered extension. In an example, each electrical contact of the second forward set of plural electrical contacts is aligned along a second straight line that is parallel to and offset from the terminal end of the tapered extension. In an example, outward facing surfaces of the first forward set of plural electrical contacts and the first rearward electrical contact are flush with the first connection face, and outward facing surfaces of the second forward set of plural electrical contacts and the second rearward electrical contact are flush with the second connection face. In an example, the first connection face defines a first forward set of plural openings or windows that are occupied by the first forward set of plural electrical contacts and a first rearward opening or window that is occupied by the first rearward electrical contact, and the second connection face defines a second forward set of plural openings or windows that are occupied by the second forward set of plural electrical contacts and a second rearward opening or window that is occupied by the second rearward electrical contact. In an example, the electronic connector further comprises one or more magnetically attractable elements in which the one or more magnetically attractable elements include a permanent magnet, an electromagnet, or a material element that is attractable by a magnet. In an example, the one or more magnetically attractable elements are included on or within the base. In an example, the electronic connector further comprises a ground bar located within the tapered extension that spans all electrical contacts of the tapered extension, and the ground contacts of the tapered extension are electrically connected to the ground bar.

In an example, an electronic device comprises a device body; a male electronic connector, including: a central tapered extension protruding from the device body, a first flanking tapered extension protruding from the device body on a first side of the central tapered extension, and spaced apart from the central tapered extension, and a second flanking tapered extension protruding from the device body on a second side of the central tapered extension opposite the first side, and spaced apart from the central tapered extension, in which the central tapered extension, the first flanking tapered extension, and the second flanking tapered extension each include a nose forming a terminal end of that tapered extension, a first connection face, a second connection face, in which the first connection face and the second connection face form respective opposing sides of that tapered extension, and taper toward each other from the device body to the nose, a first flank surface, a second flank surface, in which the first flank surface and the second flank surface form respective opposing sides of that tapered extension between the first connection face and the second connection face, and taper toward each other from the device body to the nose, a first forward set of plural electrical contacts located along the first connection face between the first flank surface and the second flank surface, and offset from the terminal end formed by the nose, a first rearward electrical contact located along the first connection face between the first forward set of plural electrical contacts and the device body, and spanning all of the first forward set of plural electrical contacts between the first flank surface and the second flank surface, a second forward set of plural electrical contacts located along the second connection face between the first flank surface and the second flank surface, and offset from the terminal end formed by the nose, and a second rearward electrical contact located along the second connection face between the second forward set of plural electrical contacts and the device body, and spanning all of the second forward set of plural electrical contacts between the first flank surface and the second flank surface; and a pass-through electronic connector located along an exterior of the device body, the pass-through electronic connector including a plurality of electrical contacts electrically connected to at least some electrical contacts of the male electronic connector.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:
1. An electronic connector, comprising:
a base;
a central tapered extension protruding from the base;
a first flanking tapered extension protruding from the base on a first side of the central tapered extension, and spaced apart from the central tapered extension; and
a second flanking tapered extension protruding from the base on a second side of the central tapered extension opposite the first side, and spaced apart from the central tapered extension;

the central tapered extension, the first flanking tapered extension, and the second flanking tapered extension each including:
  a nose forming a terminal end of that tapered extension,
  a first connection face,
  a second connection face, the first connection face and the second connection face forming respective opposing sides of that tapered extension, and tapering toward each other from the base to the nose,
  a first flank surface,
  a second flank surface, the first flank surface and the second flank surface forming respective opposing sides of that tapered extension between the first connection face and the second connection face, and tapering toward each other from the base to the nose,
  a first forward set of plural electrical contacts located along the first connection face between the first flank surface and the second flank surface, and offset from the terminal end formed by the nose,
  a first rearward electrical contact located along the first connection face between the first forward set of plural electrical contacts and the base, and spanning all of the first forward set of plural electrical contacts between the first flank surface and the second flank surface,
  a second forward set of plural electrical contacts located along the second connection face between the first flank surface and the second flank surface, and offset from the terminal end formed by the nose, and
  a second rearward electrical contact located along the second connection face between the second forward set of plural electrical contacts and the base, and spanning all of the second forward set of plural electrical contacts between the first flank surface and the second flank surface.

2. The electronic connector of claim 1, wherein the first flanking tapered extension is spaced apart from the first flank surface of the central tapered extension; and
  wherein the second flanking tapered extension is spaced apart from the second flank surface of the central tapered extension.

3. The electronic connector of claim 1, wherein the central tapered extension includes twenty electrical contacts of the first forward set of plural electrical contacts located along the first connection face of the central tapered extension; and
  wherein the central tapered extension includes twenty electrical contacts of the second forward set of plural electrical contacts located along the second connection face of the central tapered extension.

4. The electronic connector of claim 3, wherein the first flanking tapered extension and the second flanking tapered extension each include:
  ten electrical contacts of the first forward set of plural electrical contacts located along the first connection face of that flanking tapered extension;
  ten electrical contacts of the second forward set of plural electrical contacts located along the second connection face of that flanking tapered extension.

5. The electronic connector of claim 1, wherein the electronic connector is symmetric about a first symmetry plane that passes through the central tapered extension between the first flank surface and the second flank surface of the central tapered extension.

6. The electronic connector of claim 5, wherein the electronic connector is symmetric about a second symmetry plane that is orthogonal to the first symmetry plane; and
  wherein the second symmetry plane passes through each tapered extension between the first connection face and the second connection face of that tapered extension.

7. An electronic connector, comprising:
  a base;
  a tapered extension protruding from the base and including:
    a nose forming a terminal end of the tapered extension,
    a first connection face,
    a second connection face, the first connection face and the second connection face tapering toward each other from the base to the nose,
    a first flank surface,
    a second flank surface, the first flank surface and the second flank surface forming respective opposing sides of the tapered extension between the first connection face and the second connection face, and tapering toward each other from the base to the nose,
    a first forward set of plural electrical contacts located along the first connection face between the first flank surface and the second flank surface, and offset from the terminal end formed by the nose,
    a first rearward electrical contact located along the first connection face between the first forward set of plural electrical contacts and the base, and spanning two or more of the first forward set of plural electrical contacts between the first flank surface and the second flank surface,
    a second forward set of plural electrical contacts located along the second connection face between the first flank surface and the second flank surface, and offset from the terminal end formed by the nose, and
    a second rearward electrical contact located along the second connection face between the second forward set of plural electrical contacts and the base, and spanning two or more of the second forward set of plural electrical contacts between the first flank surface and the second flank surface.

8. The electronic connector of claim 7, wherein the tapered extension is one of a plurality of tapered extensions of the electronic connector.

9. The electronic connector of claim 8, wherein the plurality of tapered extensions includes a central tapered extension, and two flanking tapered extensions located on either side of the central tapered extension and spaced apart from the central tapered extension.

10. The electronic connector of claim 7, wherein the first forward set of plural electrical contacts located along the first connection face includes twenty electrical contacts; and
  wherein the second forward set of plural electrical contacts located along the second connection face includes twenty electrical contacts.

11. The electronic connector of claim 7, wherein the first forward set of plural electrical contacts located along the first connection face includes ten electrical contacts; and
  wherein the second forward set of plural electrical contacts located along the second connection face includes ten electrical contacts.

12. The electrical contact of claim 7, wherein the first rearward electrical contact spans all electrical contacts of the first forward set of plural electrical contacts; and
  wherein the second rearward electrical contact spans all electrical contacts of the second forward set of plural electrical contacts.

13. The electronic connector of claim 7, wherein each electrical contact of the first forward set of plural electrical contacts is aligned along a first straight line that is parallel to and offset from the terminal end of the tapered extension.

14. The electronic connector of claim 13, wherein each electrical contact of the second forward set of plural electrical contacts is aligned along a second straight line that is parallel to and offset from the terminal end of the tapered extension.

15. The electronic connector of claim 7, wherein outward facing surfaces of the first forward set of plural electrical contacts and the first rearward electrical contact are flush with the first connection face; and
    wherein outward facing surfaces of the second forward set of plural electrical contacts and the second rearward electrical contact are flush with the second connection face.

16. The electronic connector of claim 7, wherein the first connection face defines a first forward set of plural openings or windows that are occupied by the first forward set of plural electrical contacts and a first rearward opening or window that is occupied by the first rearward electrical contact; and
    wherein the second connection face defines a second forward set of plural openings or windows that are occupied by the second forward set of plural electrical contacts and a second rearward opening or window that is occupied by the second rearward electrical contact.

17. The electronic connector of claim 7, further comprising:
    one or more magnetically attractable elements;
    wherein the one or more magnetically attractable elements include a permanent magnet, an electromagnet, or a material element that is attractable by a magnet.

18. The electronic connector of claim 17, wherein the one or more magnetically attractable elements are included on or within the base.

19. The electronic connector of claim 7, further comprising a ground bar located within the tapered extension that spans all electrical contacts of the tapered extension; and
    wherein ground contacts of the tapered extension are electrically connected to the ground bar.

20. An electronic device, comprising:
    a device body;
    a male electronic connector, including:
        a central tapered extension protruding from the device body,
        a first flanking tapered extension protruding from the device body on a first side of the central tapered extension, and spaced apart from the central tapered extension, and
        a second flanking tapered extension protruding from the device body on a second side of the central tapered extension opposite the first side, and spaced apart from the central tapered extension,
    the central tapered extension, the first flanking tapered extension, and the second flanking tapered extension each including:
        a nose forming a terminal end of that tapered extension,
        a first connection face,
        a second connection face, the first connection face and the second connection face forming respective opposing sides of that tapered extension, and tapering toward each other from the device body to the nose,
        a first flank surface,
        a second flank surface, the first flank surface and the second flank surface forming respective opposing sides of that tapered extension between the first connection face and the second connection face, and tapering toward each other from the device body to the nose,
        a first forward set of plural electrical contacts located along the first connection face between the first flank surface and the second flank surface, and offset from the terminal end formed by the nose,
        a first rearward electrical contact located along the first connection face between the first forward set of plural electrical contacts and the device body, and spanning all of the first forward set of plural electrical contacts between the first flank surface and the second flank surface,
        a second forward set of plural electrical contacts located along the second connection face between the first flank surface and the second flank surface, and offset from the terminal end formed by the nose, and
        a second rearward electrical contact located along the second connection face between the second forward set of plural electrical contacts and the device body, and spanning all of the second forward set of plural electrical contacts between the first flank surface and the second flank surface; and
    a pass-through electronic connector located along an exterior of the device body, the pass-through electronic connector including a plurality of electrical contacts electrically connected to at least some electrical contacts of the male electronic connector.

* * * * *